United States Patent [19]

Vandeberg

[11] Patent Number: 4,654,083
[45] Date of Patent: Mar. 31, 1987

[54] LIGHT WEIGHT CONCRETE AND CEMENTITIOUS MASONRY PRODUCTS

[75] Inventor: John T. Vandeberg, Barrington, Ill.
[73] Assignee: DeSoto, Inc., Des Plaines, Ill.
[21] Appl. No.: 789,089
[22] Filed: Oct. 18, 1985
[51] Int. Cl.$^4$ .............................................. C04B 7/00
[52] U.S. Cl. ........................................ 106/86; 106/97; 524/2
[58] Field of Search ................. 106/97, 86, 90; 524/2

[56] References Cited

U.S. PATENT DOCUMENTS

| | | | |
|---|---|---|---|
| 3,650,784 | 3/1972 | Albert et al. | 106/97 |
| 3,923,704 | 12/1975 | Gunning et al. | 521/62 |
| 3,933,579 | 1/1976 | Kershaw et al. | 521/62 |
| 4,351,912 | 9/1982 | Jasperson | 524/446 |

FOREIGN PATENT DOCUMENTS 2827382  1/1979  Fed. Rep. of Germany ........ 106/97

*Primary Examiner*—William R. Dixon, Jr.
*Assistant Examiner*—Steven Capella
*Attorney, Agent, or Firm*—Dressler, Goldsmith, Shore, Sutker & Milnamow, Ltd.

[57] ABSTRACT

A concrete mix comprises a cementing agent and aggregate, the aggregate comprising vesiculated beads of cross-linked resin which beads contain an average of at least 2 thin-walled foraminous cells to provide communication between the vesicles within said bead and the exterior of said beads to allow water to move into and out of said beads. This reduces the density of the concrete and the beads hold water to help control the cure.

15 Claims, No Drawings

LIGHT WEIGHT CONCRETE AND CEMENTITIOUS MASONRY PRODUCTS

DESCRIPTION

1. Technical Field

This invention relates to concrete and cementitious masonry products, and more particularly to light weight concrete, which can be produced from a water-wet mixture of cement and filler which is more easily manipulated and which includes water-retaining reservoirs which slow the removal of water to assist in the proper cure of the concrete. The term "concrete" is here intended to embrace grout, mortar, caulk and similar products containing an inorganic cementing agent and which are used in masonry construction.

2. Background Art

Concrete is an important element of modern life which is employed in all sorts of load-bearing structures, but it possesses many inadequacies.

One difficulty is that concrete is very heavy, so light weight aggregates, including hollow beads, have been incorporated into the concrete to lighten it. The inclusion of light weight aggregates has been helpful, but the mineral aggregates still have considerable weight and are sharp-edged and stiffen the wet concrete making it harder to manipulate, as when it is desired to pump or trowel it. Hollow beads, such as glass beads, do not adhere well to the concrete and have limited load bearing capacity, and this limits their usefulness. Solid polymer particles are also useful, but they are costly from a volumetric standpoint.

Another prime difficulty is that wet concrete dries too rapidly, especially when the weather is hot and/or dry. When concrete dries too rapidly, its full strength is not developed. The concrete can be covered as it dries, for example with burlap, and the covering can be intermittently moistened, but this is troublesome. It would be helpful if the concrete itself included dispersed water-holding entities to slow the drying rate. However, when some entities hold water, as when it is absorbed onto particles, this tends to swell the particle. Later, when the particle finally releases its absorbed water, it shrinks and pulls away from the concrete around it to weaken the cured concrete. When the particle does not swell with water, only a small amount of water is held at the particle surface, and little water is retained in this fashion.

While the water in the concrete can be associated with water soluble polymers to produce high strength concrete combinations, these combinations require expensive equipment and difficult processing for proper utilization.

The capacity of the concrete to flow is also important in such diverse areas as pumpability, trowelability and the elimination of internal voids. Concrete is frequently deficient in these areas.

As a result, there is considerable room for improvement, especially if several of the problems can be minimized or eliminated at the same time, and most especially if this can be done economically.

DISCLOSURE OF INVENTION

In accordance with this invention, a concrete mix has dispersed therein vesiculated beads of cross-linked resin, the beads containing an average of at least 2, more usually at least 5, thin-walled foraminous cells which allow water to move into and out of the beads. These cells preferably include at least some cell walls which are discontinuous on electron microscope examination to provide communication between the vesicles within the bead and the exterior of the bead and thus enable movement of liquid by capillary action, though this action may not require openings large enough to be seen. The very thin walls of the cells (about 0.2 micron) are concluded to be foraminous, for water contained therein is easily removed by simple exposure to air even though no fissure large enough for the electron microscope to pick up is found in many of the cells.

The typical concrete mix comprises a cementing agent, water and reinforcing aggregate, the aggregate component usually including coarse aggregate typically crushed stone or gravel, and fine aggregate, such as sand or vermiculite. In this invention, all or a portion of the fine aggregate comprises vesiculated beads of cross-linked resin which hold water to control the cure and which greatly reduce the density of the concrete. More particularly, the beads of this invention constitute from 5% to 100% of the fine aggregate, preferably from 10% to 50% thereof.

In a typical concrete, 1 part by volume of cement is combined with from 1.5 to 3.5 parts by volume of fine aggregate and from 2.5 to 5.5 parts by volume of coarse aggregate. These proportions are varied depending upon the intended use of the concrete, but this invention is applicable to all of these variations.

In use, the beads can be added to the concrete mix at the same time it is formed, in which case these beads desirably include some of the water in which they were formed. On the other hand, the concrete mix can be a dry mix to which water is subsequently added, in which case the beads are dried before they are added to the mix.

The cementing agents which may be used are subject to wide variation, as is well known in the art. Gypsum plaster, common lime, hydraulic limes, Puzzolan, natural and Portland cement are a few of the cementing agents which have been used in concrete, Portland cement being the best known.

Using Portland cement as illustrative, when water is mixed in with the cement and aggregate, the concrete sets in a few hours and hardens over a period of weeks. The setting is usually due to the formation of tricalcium aluminate accompanied by the separation of gelatinous hydrated material. The hardening and development of cohesive strength are due to the interaction of water with tricalcium silicate and, subsequently, with dicalcium silicate. The ultimate cementing agent in these complex mixtures is probably gelatinous silica.

As will be evident, the multicelled structure and cross-linked resinous character of the beads used herein provides a very light weight fine aggregate which greatly lightens the concrete, making it of especial value where decreased weight is important. These cells enhance the thermal and sound insulative character of the cured concrete, and these qualities can be important in some instances.

In addition to being very light in weight, these beads are unlike ordinary hollow beads in having great strength because of their many-celled structure and the fact that the resin constituting the cell walls is cross-linked. In this way, the very light beads have the strength to avoid being deformed or crushed by the hydraulic loadings imposed by the wet concrete. However, the cross-linked resin is not swollen by the water, so the beads used herein are unlike absorptive materials and do not shrink perceptibly when water is lost as the concrete is cured. As a result, the loss in strength which might be expected from the presence of an aggregate which shrinks during cure is not experienced.

Despite their many-celled foraminous character, the beads are sufficiently round and strong to act as bearings which enhance the capacity of the wet concrete to be physically manipulated, e.g., to be pumped, poured, molded or troweled. The increased capacity to manipulate the wet concrete makes it easier to use, and this is important. Also, wet concrete tends to entrap air bubbles which form voids in the cured mass. Wet concrete is sometimes vibrated to minimize this difficulty. The presence of the round beads in the invention improves the mixing operation and minimizes the tendency to entrap bubbles and the ease with which vibration releases these bubbles.

The capacity of the compositions of this invention to be easily pumped without too much water being present is of especial importance in grouts where the cement-water mixtures, which may include some aggregate or sand, are frequently pumped into place through drilled holes to fill voids or cracks in foundations. This is frequently done to repair defects beneath a preformed roadway.

Various grout compositions to which this invention is applicable are described in "Cement-Grout Subsealing and Slabjacking of Concrete Pavements" published by the Portland Cement Association in 1982.

Moreover, these beads when formed retain up to about 70%, typically about 60%, by volume of water * even after excess water has been drained from the beads to provide a dry-appearing cake. As a result, these beads contain within themselves a considerable proportion of water. This water is easily removable from the beads, as by simple evaporation, and contact with drier particles pulls the water out of the beads by capillary action. As a result, the beads under consideration uniquely provide tiny, light weight, water reservoirs which prevent unduly rapid drying of a wet concrete mass containing the same.

* Volume percent water is the same as weight percent water modified by the densities of water and the material constituting the beads.

This capacity to retain water and thus slow the rapid loss of water as the composition cures is of especial importance to mortar compositions where unduly rapid loss of water is a frequent hazard, causing the mortar to stiffen quickly, making it very difficult to obtain a good bond and a weather-tight joint. A mortar that has good water retentivity remains soft and plastic long enough for the masonry units to be aligned, leveled, plumbed, and adjusted without breaking the intimate contact between the mortar and the units being joined.

Typical mortars will contain about 1 volume of cementitious material, such as masonry cement or a known mixture of Portland cement and lime, to from 2¼ to 3½ volumes of damp, loose mortar sand, a desired proportion of the mortar sand being replaced by the beads of this invention. The use of various proportions of hydrated lime or lime putty in mortars is well known and varies with the type of mortar which is under consideration. The Portland cement component is omitted in pure lime mortars. In proportion to the quantity of sand which is replaced, the beads of this invention make the mortar softer, more trowelable and slower drying.

Various mortar compositions to which this invention is applicable are described in "Mortars for Masonry Walls" published by the Portland Cement Association in 1976.

Referring more particularly to the vesiculated beads which are useful in this invention, these must be substantially unground, for aggressive grinding breaks up the beads and impairs their usefulness. The beads may vary in average size of from about 1 micron to about 200 microns, but beads having an average size of from 5 microns to 150 microns are preferred. These beads preferably average at least about 5 vesicles per bead.

The beads in this invention can be stored as a water wet cake to be mixed into concrete as it is formed, or the beads can be dried and mixed into a dry concrete mix which can be bagged in a water-excluding container and stored in the dry form for subsequent use by simple admixture with water.

To summarize the many advantages which are obtained by this invention, there is provided an improved strength to weight ratio, the concrete compositions are more pumpable and workable and exhibit improved flow and leveling, less air is entrapped in the concrete, the aggregate is more secure bonded, there is less shrinkage curing cure and the cure is more easily controlled, the cured concrete better resists weathering and attack by various chemicals, including acids and alkalis, the smoother surface and more impenetrable cured mass provides greater resistance to water, abrasion and dusting, and the pigmented beads provide an attractive appearance including the opportunity to introduce many unusual decorative effects.

The beads in this invention are preferably used containing the water which remains from their production. The fresh beads are usually drained to provide a dry-appearing cake which typically contains about 55% by volume of water. However, there is nothing to prevent the presence of additional water, or one can allow drying to remove some of the water in the dry-appearing cake. When the beads contain less than their normal (as drained) water content, they will absorb water from the wet mixture, and this should be considered in determining the proper amount of water to be added to the wet concrete mixture.

The water-containing beads can be packaged in an impervious plastic container, such as a plastic bag, in order to prevent the water which is present from evaporating before the beads are incorporated into a wet concrete mix.

On the other hand, if it is desired to include the beads in a dry concrete mix, then the beads must be dried so as to be substantially free from water. This can be provided by removing water from the water-wet paste of vesiculated beads which is provided when these beads are produced by polymerization in aqueous emulsion.

When the beads are dried so as to be substantially free from water, this denotes a water content of less than about 0.2% by weight. Unless some precaution is taken, these beads will include the adhesive agents which are present when the beads are formed by polymerization in aqueous emulsion, and if these agents are not removed, then the beads will tend to stick to one another. This stickiness can be tolerated, especially when the dried beads are mixed with the other dry particulate components of a dry concrete mix which serves to separate them.

Water removal can be by simple exposure to air at room temperature, by passing heated air, typically at a temperature of 100° F. to 120° F. over the beads, by tumbling the wet beads in a rotating structure such as a pipe or centrifuge basket, or by dropping them through a tower with drying gas moves upwardly therethrough, by vacuum drying, by using an azeotroping solvent, or in any other desired manner.

If desired, the tendency of the beads to agglomerate can be avoided by washing the beads with water one or more times to remove the surfactants and colloidal material involved in their production with the wash water. Solvent washing is also permitted, and the water can be azeotropically removed by heating the solvent.

The water-wet paste which is treated in the above manner is formed when excess water is drained from the aqueous suspension obtained when the beads are prepared in aqueous suspension, a surfactant and/or protective colloid being needed to maintain the suspension while the beads are produced. A typical paste is called a cake, and it usually contains about 60% water by volume, as previously indicated.

The beads in this invention can be pigmented or unpigmented, depending upon whether it is desired to color the concrete which is produced. The pigments contemplated are finely divided, such as titanium dioxide, calcium carbonate, silica or clay, and they reinforce the walls of the cells. * The pigments can be white, colored, or flourescent, and used alone or in combination. Interesting decorative effects can be obtained by gently swirling the colored beads in the wet mix to obtain striations of different color. Pigmentation does more than impart coloration, namely: it serves to increase the mechanical strength of the beads which is helpful in resisting the hydraulic pressures encountered when the concrete is poured, especially when deep structures, such as load-bearing walls, are to be formed. The beads may contain particles of larger size and of diverse shape, including particles of rod shape, such as iron filings, chopped glass fiber, graphite, and the like.

When it is desired that the pigment be incorporated into the walls of the beads as they are formed, it is included in the emulsion system which is polymerized to form an aqueous suspension of vesiculated beads which is drained to form a water-wet paste or cake. For example, organic and inorganic pigments, fluorescent pigments, and the like, may be incorporated into the beads. It is contemplated that fungicides and biocides may also be incorporated to prevent organism growth on concrete exposed to inland and ocean waters. The procedure for producing these beads involves polymerization in aqueous emulsion in the presence of surfactants and, preferably also, protective colloids such as polyvinyl alcohol and hydroxyethyl cellulose. These agents are of adhesive character, as has been stated.

The preferred vesiculated beads are styrene-cross-linked unsaturated polyester resins. These are made into a vesiculated bead in conventional fashion, as illustrated by U.S. Pat. No. 3,879,314. Various other patents are of interest to the formation of vesiculated beads useful in this invention, particular attention being directed to U.S. Pat. Nos. 3,822,224, 3,923,704 and 3,933,579. This last-named patent describes the vesiculated beads which are preferred herein, namely, those having a ratio of granular diameter to mean vesicle diameter of at least 5:1, a vesicle volume of from 5% to 95% of the volume of the granule, and not more than about 60% pigment, by volume.

The vesiculated beads used herein have a highly cross-linked polymeric body which is preferably constituted by a carboxyl-functional unsaturated polyester resin cross-linked with an ethylenically unsaturated monomer copolymerizable therewith. The unsaturation in the polyester is preferably maleate unsaturation, these polyesters being themselves well known and illustrated hereinafter. It is preferred that the polyester have an acid value of 10 to 45 mgm KOH per gm.

It is desired to point out that the concrete should chemically react with the beads in order to provide a good bond between the concrete and the particles within them. This chemical reaction occurs here because the ions in the concrete, and especially the calcium ions, are strongly reactive with the carboxyl functional groups in the beads. Also, some of the cells in the beads are not fully formed, so while the beads have an overall round configuration, some of the outer cells are open, and this allows a mechanical interlinking to supplement the chemical bonds which are formed between the outer walls of the beads and the concrete. Particle size selection also contributes to the improved strength to weight ratio which is obtained.

During the bead production process, water migrates into the polymeric beads to swell them, and the polymer in the bead walls polymerizes at the same time. As a result, it is normal to have some of the cell walls fracture, and the extent of fracturing can be controlled by controlling the polymerization process. The more polymerization can be delayed, the greater the number of cell walls which are either not present or disrupted. In this way, the amount of fissuring and the number of open cells at the exterior of the vesiculated beads can be varied.

The unsaturated monomers used for cross-linking are also well known and are water insoluble monomers typically illustrated by styrene or vinyl toluene. The polyesters and monomers which may be used are more fully discussed in U.S. Pat. No. 3,879,314 which shows the production of vesticulated beads using a water-soluble polyamine containing at least three amine groups per molecule and having a dissociation constant in water (pKa value) of 8.5–10.5, typically illustrated by diethylene triamine. The polyamine is used in a concentration providing 0.3 to 1.4 amine groups per polyester carboxyl group. It is preferred to have from 35% to 45% of the unsaturated polyester cross-linked with from 55% to 65% of styrene.

Suitable pigmented vesiculated beads in accordance with this invention are illustrated in U.S. Pat. No. 3,879,314 issued Apr. 22, 1975, see particularly Example II. By proceeding in accordance with said Example II and using a polyester of 18% phthalic anhydride, 37% maleic anhydride and 45% propylene glycol dissolved in styrene to form a solution containing 41.8% of the polyester, vesiculated beads pigmented with titanium dioxide, anatase, to contain about 43.2% pigment are provided. These beads have an average size of about 9 microns and contain an average of more than 10 cells per bead, and are the beads used in the Examples of this application.

The invention is illustrated in the examples which follow. All parts and proportions herein are by weight unless otherwise specified.

EXAMPLE 1

An aqueous slurry of vesiculated beads has the bulk of its water content removed by decantation to provide an aqueous paste (termed a beadcake) containing 35 parts of vesicular beads, 64.5 parts water by volume, 0.18 parts of a 75% solution of sodium dioctyl sulfosuccinate (the American Cyanamid surfactant, Aerosol OT may be used), 0.28 parts polyvinyl alcohol and 0.04 parts hydroxy ethyl cellulose. These surfactants and colloids are typical residues of bead production and might cause agglomeration if the water were removed by simple drying. The vesiculated beads are composed of 56.0% resin and 44.0% titanium dioxide. The bead resin is an unsaturated polyester containing propylene glycol/maleic anhydride/phthalic anhydride in proportions of 3.72/2.06/4.22, and this polyester is dissolved in styrene to provide a 58/42 ratio of styrene to polymers. To form the beads, the mixture of polyester and styrene is dispersed in water with the aid of surfactants and protective colloids in the proportions noted and copolymerized in the presence of a quaternary ammonium salt to cause vesicles to form as described in U.S. Pat. No. 3,879,314. The resulting vesiculated beads are in water slurry, and this is drained to provide the beadcake which is incorporated into the wet concrete mixes described hereinafter.

EXAMPLE 2

(control)

A typical concrete for the production of floors, beams and columns is provided by mixing, by volume, 1 part of Portland cement, 2 parts of sand and 4 parts of crushed stone. This mixture is then mixed with water to provide a trowelable mix which is placed in a form and allowed to cure. The wet mixture is difficult to trowel and tends to dry too rapidly, so it is covered with burlap and periodically wetted to slow the drying process. The result is a typical cured concrete which is very dense.

EXAMPLE 3

Example 2 is repeated except half the volume of sand is removed and replaced by the wet beadcake described in Example 1. Water is then added to provide the same slurry viscosity in Example 2 and the wet mixture flows more easily and is more easily trowelable to form a smoother surface on the wet mixture in the form. This wet mixture dries more slowly, so it is not necessary to cover it with burlap and keep it wet. The cured product is very much the same as in Example 2, but it is smoother, whiter and lower in density.

EXAMPLE 4

Dry beads are provided by starting with the wet beadcake of Example 1. This wet beadcake described is dispersed in 50% of its volume of ordinary water with agitation and allowed to settle, the water being decanted to lower the concentration of adhesive agents. This operation is repeated several times with about 300% by volume of ordinary water to obtain water-containing beads substantially free of agglomerating adhesive agents. These water-wet beads are dried by spreading them on a tray and passing warm air at a temperature of about 110° F. thereover. The water on and within the beads simply evaporates, and the drying process is quite effective, providing obtain beads which are dry enough to be combined with isocyanate-functional liquids without inducing reaction with water.

A commercial "Sakrete" mixture is modified by replacing 10% of the volume of sand contained therein with the same volume of the dried beads described above.

Upon admixture with water to provide a wet mixture of usual viscosity, it is found that the mixture pours and trowels easily and dries without special precaution to form a cured smooth and white product having fewer bubbles and lower density than the commercial mixture.

In the same manner, one can obtain much the same properties by adding the wet beadcake of Example 1 directly to the "Sakrete" mixture, but now the proportion of inorganic binder is reduced, and this factor can modify properties when large amounts of beadcake are added.

EXAMPLE 5

A conventional grout for repairing concrete surface defects (small voids and cracks) is made by mixing equal volumes of Portland cement and sand passing a No. 30 sieve and mixed to a creamy consistency with water. This conventional grout is then made again replacing 25% of the sand with the same volume of the beads of Example 1. It is found that the grout flows more easily and can be more expeditiously troweled into the surface defects to be repaired.

EXAMPLE 6

Example 5 is repeated replacing the sand with 3 times its volume of pozzolanic materials, such as volcanic ash, diatomaceous earth and fly ash. Corresponding results are obtained when 25% of the volume of the pozzolanic material is replaced by the beads of Example 1.

EXAMPLE 7

A conventional mortar is made by mixing one volume of Portland cement with ½ volume of hydrated lime and three volumes of damp, loose mortar sand. These are mixed to a viscous creamy consistency with water. This conventional mortar is then made again replacing 10% of the sand with the same volume of the beads of Example 1. It is found that the mortar flows more easily and can be more expeditiously troweled onto the bricks being used.

Various modification can be made without departing from the invention as defined hereinafter. To illustrate, aqueous emulsions of binder particles can be added, as is known in the art, to take advantage of their adhesive character.

What is claimed is:

1. A concrete mix comprising a cementing agent and aggregate, said aggregate comprising vesiculated beads of cross-linked resin, said beads containing an average of at least 2 thin-walled foraminous cells to provide communication between the vesicles within said beads and the exterior of said beads to allow water to move into and out of said beads.

2. A concrete mix as recited in claim 1 in which at least some of said cell walls are discontinuous as determined by electron microscopy, and there are an average of at least 5 thin-walled cells per bead.

3. A concrete mix as recited in claim 1 in which said beads have an average size of from about 1 micron to about 200 microns.

4. A concrete mix as recited in claim 2 in which said beads have an average size of from about 5 micron to about 150 microns.

5. A concrete mix as recited in claim 1 in which said beads have a ratio of granular diameter to mean vesicle diameter of at least 5:1, a vesicle volume of from 5% to 95% of the volume of the granule, and not more than about 60% pigment, by volume.

6. A concrete mix as recited in claim 5 in which said beads are constituted by a carboxyl-functional unsaturated polyester resin cross-linked with an ethylenically unsaturated monomer copolymerizable therewith.

7. A concrete mix as recited in claim 5 in which said beads are pigmented.

8. A concrete mix as recited in claim 7 in which said pigment comprises finely divided particles selected from titanium dioxide, calcium carbonate, silica and clay.

9. A concrete mix as recited in claim 1 in which said aggregate comprises coarse and fine aggregate, said beads constituting from 5% to 100% of said fine aggregate.

10. A concrete mix as recited in claim 1 in which said cementing agent is Portland cement.

11. A dry concrete mix comprising a cementing agent and aggregate, said aggregate comprising dry vesiculated beads of cross-linked resin, said beads containing an average of at least 2 thin-walled foraminous cells to provide communication between the vesicles within said beads and the exterior of said beads to allow water to move into and out of said beads when said mix has water added thereto.

12. A method of forming a wet concrete mix comprising a cementing agent and aggregate containing water-holding beads comprising, mixing said cementing agent and water with said aggregate including a water-wet beadcake of vesiculated beads of cross-linked resin, said beads containing an average of at least 2 thin-walled foraminous cells to provide communication between the vesicles within said beads and the exterior of said beads to allow water to move into and out of said beads, said beadcake containing the surfactants and colloids used to produce the same.

13. A method as recited in claim 12 in which said beadcake contains about 60% by volume of water.

14. A concrete mix as recited in claim 1 in which said mix is a grout.

15. A concrete mix as recited in claim 1 in which said mix is a mortar.

* * * * *